US008714290B2

(12) United States Patent
Kitashiba et al.

(10) Patent No.: US 8,714,290 B2
(45) Date of Patent: May 6, 2014

(54) GRILLE SHUTTER DEVICE

(75) Inventors: Masayuki Kitashiba, Kiyosu (JP); Chiharu Totani, Kiyosu (JP); Minoru Shibata, Kiyosu (JP); Kazuo Takeda, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/551,791

(22) Filed: Jul. 18, 2012

(65) Prior Publication Data

US 2013/0025952 A1   Jan. 31, 2013

(30) Foreign Application Priority Data

Jul. 27, 2011 (JP) ................................. 2011-164439

(51) Int. Cl.
*B60K 11/08* (2006.01)
(52) U.S. Cl.
USPC .......... 180/68.1; 180/69.24; 165/41; 49/74.1; 49/92.1
(58) Field of Classification Search
USPC ............. 180/68.1, 68.3, 69.24; 49/73.1, 74.1, 49/87.1, 92.1, 104; 74/25, 42, 44, 45; 165/41
See application file for complete search history.

(56) References Cited

U.S. PATENT DOCUMENTS

| 2,276,279 | A | * | 3/1942 | Asklund ...................... 180/68.1 |
| 2,551,921 | A | * | 5/1951 | Arsem ...................... 123/41.04 |
| 2,792,711 | A | * | 5/1957 | Demornay ........................ 74/25 |
| 2,847,729 | A | * | 8/1958 | Zingone ........................ 49/74.1 |
| 3,177,367 | A | * | 4/1965 | Brown ....................... 250/237 R |
| 3,691,684 | A | * | 9/1972 | Boneck .............................. 49/21 |
| 3,861,223 | A | * | 1/1975 | Braun et al. ...................... 74/44 |
| 4,614,059 | A | * | 9/1986 | Trampe .......................... 49/118 |
| 5,179,802 | A | * | 1/1993 | Higton ........................... 49/74.1 |
| 5,470,276 | A | * | 11/1995 | Burnell et al. ................. 454/155 |
| 6,131,336 | A | * | 10/2000 | Krause et al. .................. 49/74.1 |
| 6,854,211 | B1 | * | 2/2005 | Blachley ........................ 49/82.1 |
| 7,252,490 | B2 | * | 8/2007 | Wymbs ........................... 425/92 |
| 2010/0243352 | A1 | * | 9/2010 | Watanabe et al. ............. 180/68.1 |
| 2011/0226541 | A1 | * | 9/2011 | Hori et al. ..................... 180/68.1 |

FOREIGN PATENT DOCUMENTS

| DE | 3145414 A1 * | 6/1982 | ............ B60K 11/08 |
| JP | A-2009-029186 | 2/2009 | |
| JP | A-2010-223150 | 10/2010 | |

* cited by examiner

*Primary Examiner* — John Walters
*Assistant Examiner* — Steve Clemmons
(74) *Attorney, Agent, or Firm* — Posz Law Group, PLC

(57) ABSTRACT

A grille shutter device selectively opening and closing a grille opening in the front grille of a vehicle. The grille shutter device includes a fin, a motor, a transmission mechanism, a first switch, and a second switch. The fin has a support shaft, which is rotatably supported by the front grille. When supplied with electricity, the motor rotates its output shaft in one direction. The transmission mechanism converts the rotation of the output shaft to a swinging motion of the fin, thereby swinging the fin between a closed position, where the fin closes the grille opening, and an open position, where the fin opens the grille opening. When the fin is swung to the closed position, the first switch stops the motor. When the fin is swung to the open position, the second switch stops the motor.

8 Claims, 4 Drawing Sheets

GRILLE SHUTTER DEVICE

BACKGROUND OF THE INVENTION

The present invention relates to a grille shutter device for selectively opening and closing, with fins, a grille opening in the front grille of a vehicle.

A typical front grille on the front side of a vehicle has a grille opening for introducing outside air to the front side of the radiator located in the engine compartment. The outside air that has passed through the grille opening cools coolant in the radiator, so that the engine is prevented from overheating.

However, when the temperature of the outside air is low, for example, in the winter, the outside air that contacts the radiator after passing through the grille opening degrades efficiency of the warm-up performed immediately after the engine is started. Also, when the vehicle is traveling at a high speed, the outside air might excessively cool the coolant in the radiator. Further, the drawn-in outside air might produce turbulence in the engine compartment, which increases the air resistance to the vehicle.

In this regard, a type of grille shutter device has been proposed that includes fins at the grille opening. The fins are opened or closed by an actuator, for example, in accordance with vehicle speed and the temperature of coolant (for example, refer to Japanese Laid-Open Patent Publication No. 2010-223150).

The grille shutter device disclosed in Japanese Laid-Open Patent Publication No. 2010-223150 controls opening and closing of the fins in accordance with the direction of rotation of the actuator main shaft. When opening the fins, the main shaft of the actuator is rotated in a forward direction. When closing the fins the main shaft is rotated in a reverse direction. That is, when the swinging direction of the fins is switched for opening or closing the fins, the rotational direction of the actuator main shaft needs to be switched. This complicates the control for opening and closing the fins.

SUMMARY OF THE INVENTION

It is an objective of the present invention to provide a grille shutter device that is capable of opening and closing fins through simple control.

To achieve the foregoing objective, and in accordance with one aspect of the present invention, a grille shutter device for selectively opening and closing a grille opening in a front grille of a vehicle is provided. The grille shutter device includes at least one fin, a motor, a transmission mechanism, a first switch, and a second switch. The fin has a support shaft, which is rotatably supported by the front grille. The fin can be swung about the support shaft between a closed position, where the fin closes the grille opening, and an open position, where the fin opens the grille opening. The motor has an output shaft. When supplied with electricity, the motor rotates the output shaft in a predetermined direction, and when the supply of electricity is stopped, the motor stops rotation of the output shaft. The transmission mechanism transmits rotation of the output shaft in the predetermined direction to the fin while converting the rotation to a swinging motion of the fin, thereby swinging the fin between the closed position and the open position. When electricity is supplied to the motor and the fin is swung to the closed position, the first switch contacts a part of the transmission mechanism to stop the supply of electricity. When electricity is supplied to the motor and the fin is swung to the open position, the second switch contacts a part of the transmission mechanism to stop the supply of electricity.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

In the following, the traveling direction of the vehicle is defined as a forward direction. The rearward, upward, downward, leftward, and rightward directions are defined with reference to the forward direction.

Figure 1:
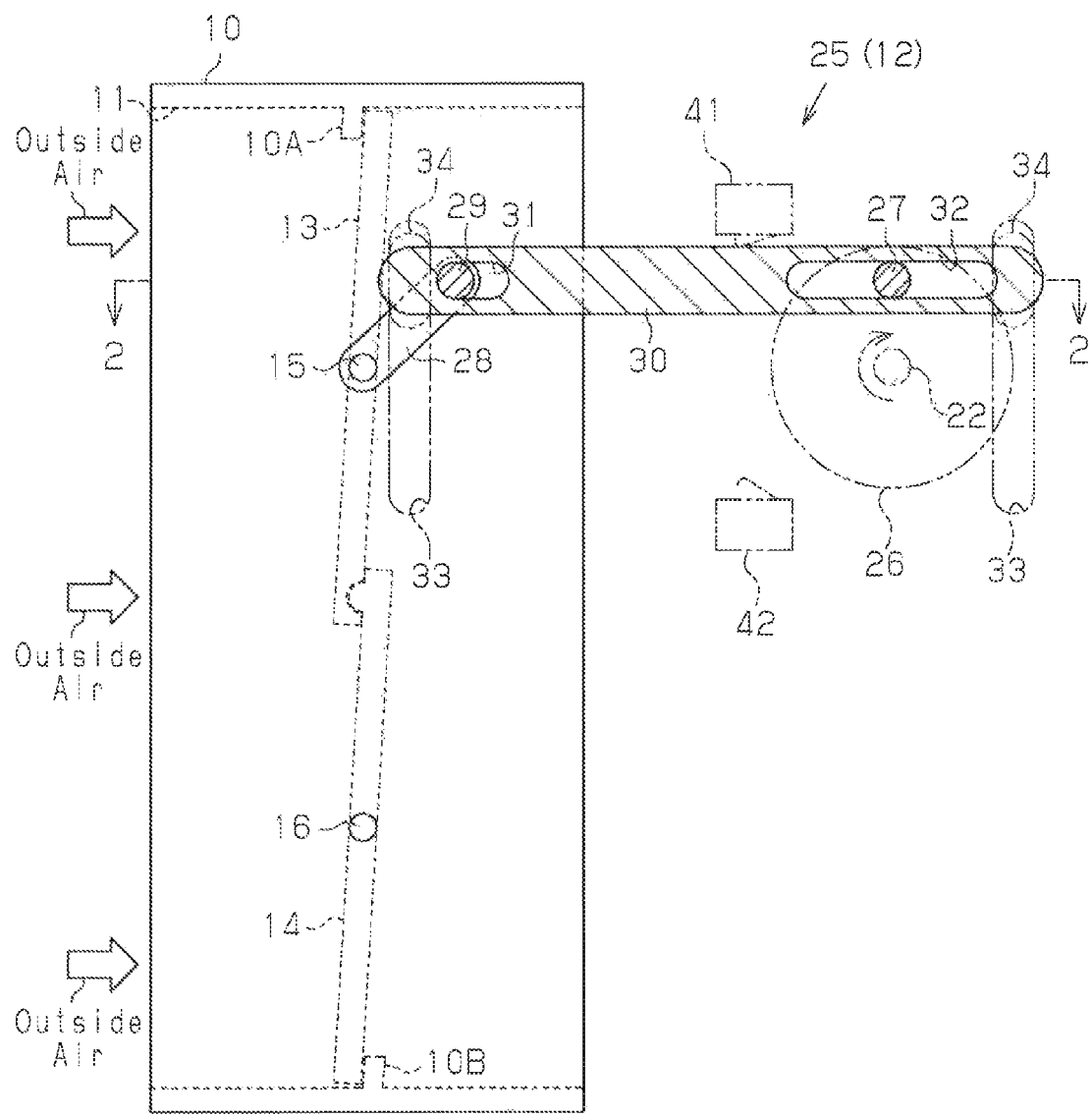
FIG. 1 is a cross-sectional side view of a grille shutter device according to one embodiment of the present invention, showing a state in which fins are stopped at a closed position.
Figure 2:
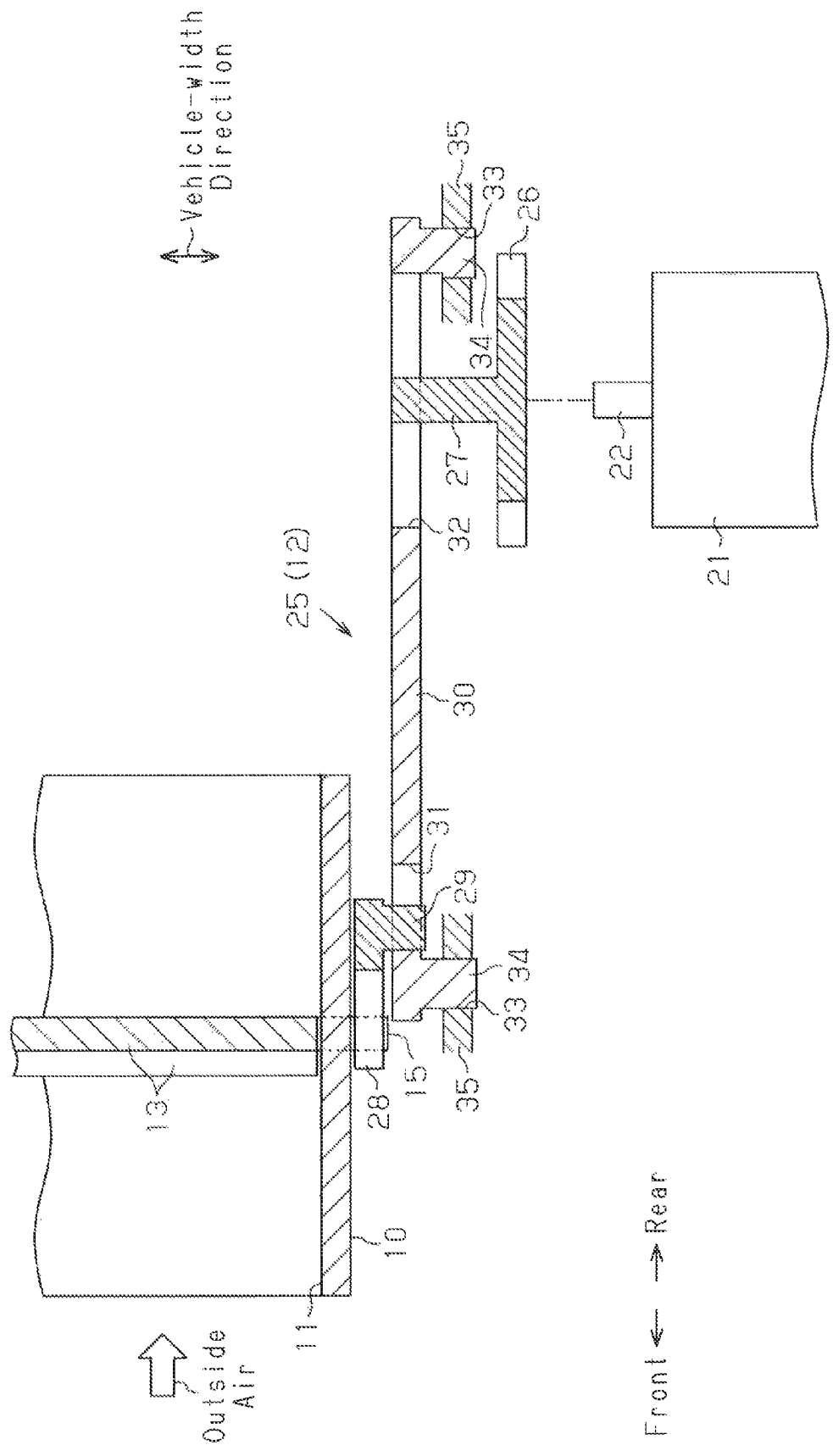
FIG. 2 is a partial cross-sectional view taken along line 2-2 of FIG. 1, showing the grille shutter device.

As shown in FIGS. 1 and 2, a front grille 10 provided on the front side of a vehicle includes a grille opening 11. The grille opening 11 draws in outside air to the front side of the radiator (not shown) located in the engine compartment. To simplify the description, the front grille 10 is depicted as a rectangular tube having open front and rear ends. The front grille 10 has a grille shutter device 12 for selectively opening and closing the grille opening 11. The grille shutter device 12 includes two fins 13, 14, a motor 21, a transmission mechanism 25, a first switch 41, and a second switch 42.

Figure 3:
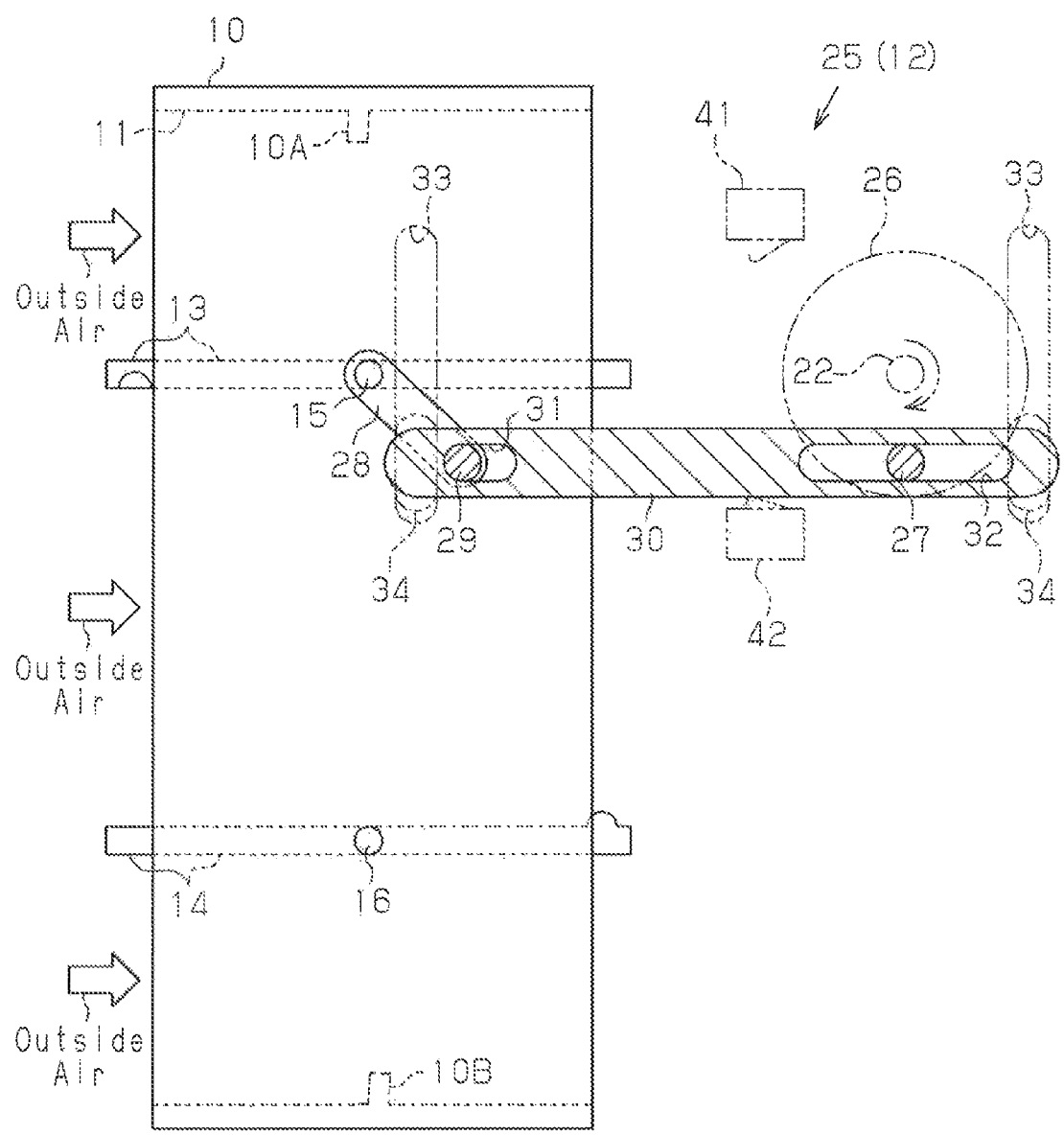
FIG. 3 is a cross-sectional side view of the grille shutter device of the embodiment shown in FIG. 1, showing a state in which the fins are stopped at an open position.

In the present embodiment, fins 13, 14 are each shaped like a plate. The fins 13, 14 are arranged in the grille opening 11 to be parallel to each other. The fin 13 has a support shaft 15, which extends in the direction of the width of the vehicle (the up-down direction as viewed in FIG. 2). The support shaft 15 protrudes from both ends of the fin 13 in the vehicle width direction. The fin 14 has a support shaft 16, which extends in the direction of the width of the vehicle. The support shaft 16 protrudes from both ends of the fin 14 in the vehicle width direction. The support shaft 15 and the support shaft 16 are separated from each other in the up-down direction. The fins 13, 14 are supported by the support shafts 15, 16, respectively, to be swung relative to the front grille 10. The fins 13, 14 are swung between a closed position, at which the fins 13, 14 close the grille opening 11 as shown in FIG. 1, and an open position, at which the fins 13, 14 open the grille opening 11 as shown in FIG. 3. At the closed position, the fins 13, 14 are oriented vertically or substantially vertically. At the open position, the fins 13, 14 are oriented horizontally or substantially horizontally. At the open position, the fins 13, 14 are substantially parallel with the direction of outside air flowing through the grille opening 11. That is, the grille opening 11 is in the fully open state when the fins 13, 14 are at the open position. The fins 13, 14 are swung in the range of substantially 90° between the closed position and the open position.

The grille shutter device 12 has a mechanism for swinging the fins 13, 14 in a synchronized manner. The mechanism can be formed by a link mechanism described in the following. The fin 13 has a coupler shaft (not shown) at positions different from the positions of the support shaft 15. The coupler shaft protrudes from the fin 13 in the vehicle width direction at positions on both sides of the fin 13 in the vehicle width direction. The fin 14 has a coupler shaft (not shown) at positions different from the positions of the support shaft 16. The coupler shaft protrudes from the fin 14 in the vehicle width direction at positions on both sides of the fin 14 in the vehicle width direction. The fins 13, 14 are coupled to each other by coupler rods (not shown), which are operably supported by the coupler shafts of the fins 13, 14. The fins 13, 14, the coupler shafts, and the coupler rods form a link mechanism. When the fin 13 is swung, the swinging motion of the fin 13 is transmitted to the other fin 14 via the coupler shafts and the coupler rods. This swings the fin 14 in synchronization with the fin 13.

A stopper 10A and a stopper 10B are located on the inner surface of the upper wall and the inner surface of the lower wall of the grille opening 11, respectively. The upper stopper 10A is located above the support shaft 15. The upper stopper 10A is configured to contact the front side of the upper end of the fin 13 when the fin 13 is at the closed position. The upper stopper 10A limits the forward movement of the upper end of the fin 13, and thus limits the counterclockwise swinging of the fin 13 as viewed in FIG. 1. The lower stopper 10B is located below the support shaft 16. The lower stopper 10B is configured to contact the rear side of the lower end of the fin 14 when the fin 14 is at the closed position. The lower stopper 10B limits the rearward movement, of the lower end of the fin 14, and thus restricts the counterclockwise swinging of the fin 14 as viewed in FIG. 1.

The motor 21 is a drive source for swinging one of the fins. In the present embodiment, the motor 21 swings the upper fin 13. The motor 21 rotates an output shaft 22 in one direction when supplied with electricity, and stops the rotation when the supply of electricity is stopped. In the embodiment shown in FIG. 1, the motor 21 rotates the output shaft 22 clockwise as viewed in FIG. 1. In the present embodiment, a DC motor is used as the motor 21. However, other types of motors may be used. The output shaft 22 of the motor extends in the vehicle width direction.

The transmission mechanism 25 transmits rotation of the output shaft 22 of the motor 21 to the fin 13. Specifically, the transmission mechanism 25 converts rotation in one direction of the output shaft 22 into swinging motion of the fin 13. In this manner, the transmission mechanism 25 swings the fin 13 between the closed position and the open position. The transmission mechanism 25 includes a rotation member 26, an eccentric shaft 27, a lever 28, and a rod 30.

The rotation member 26 is attached to the output shaft 22 of the motor 21 to rotate integrally with the output shaft 22. In the present embodiment, the rotation member 26 is shaped like a disk.

Figure 4:
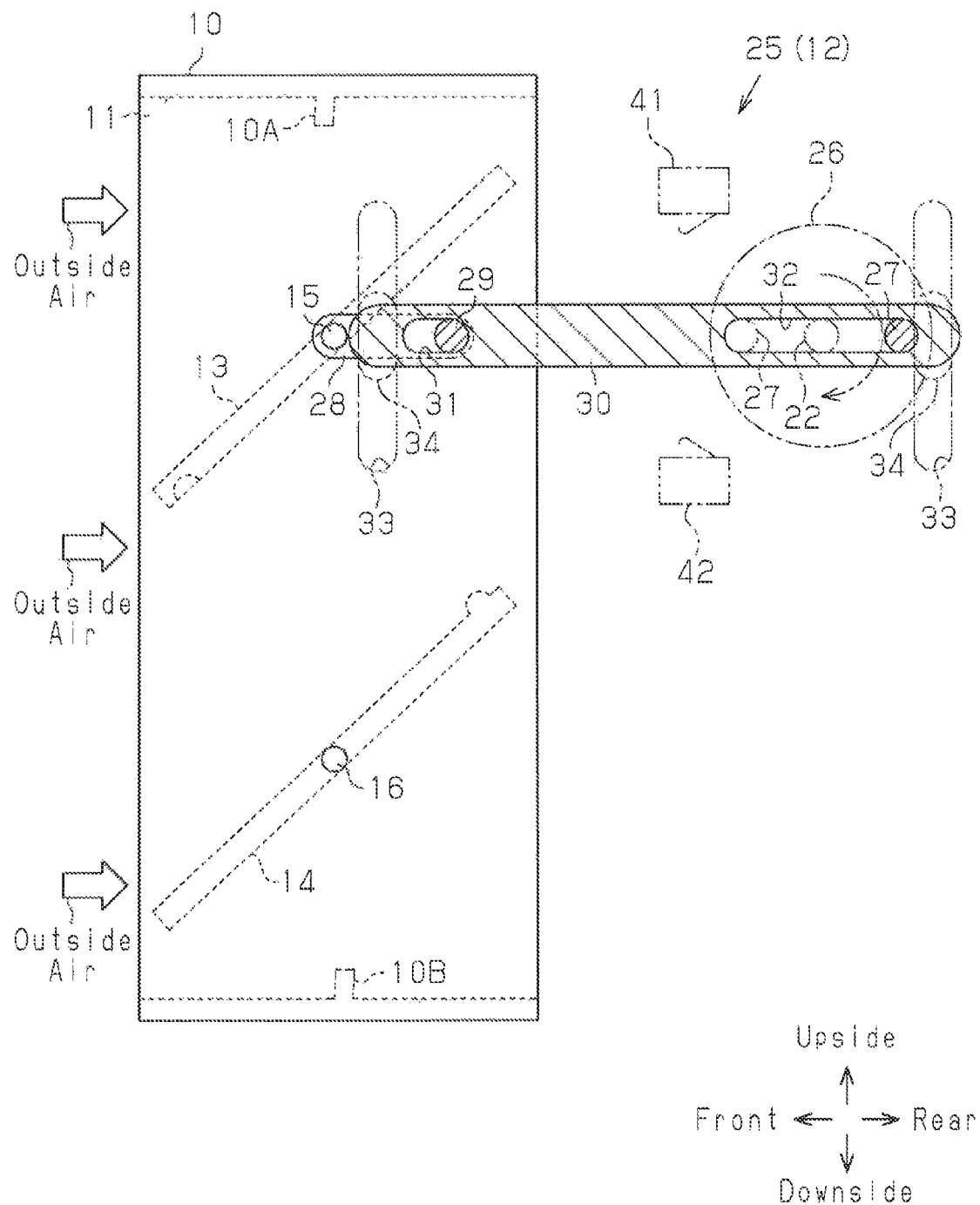
FIG. 4 is a cross-sectional side view of the grille shutter device of the embodiment shown in FIG. 1, showing a state in which the fins are at a midway position between the closed position and the open position.

The eccentric shaft 27 is located at a position on the rotation member 26 that is separated from the output shaft 22, and extends in the vehicle width direction. As the output shaft 22 rotates, the eccentric shaft 27 orbits about the output shaft 22. When the fin 13 is at the closed position as shown in FIG. 1, the eccentric shaft 27 is at the highest position in the movable range. When the fin 13 is at the open position as shown in FIG. 3, the eccentric shaft 27 is at the lowest position in the movable range. When the fin 13 is swung between the closed position and the open position as shown in FIG. 4, the eccentric shaft 27 is located between the highest position and the lowest position.

The lever 28 has an elongated shape and is integrally attached at its front end to the fin 13 via the support shaft 15 in the following manner. The lever 28 can swing about the support shaft 15 together with the fin 13. That is, when the fin 13 is swung to the closed position as shown in FIG. 1, the lever 28 is inclined such that its rear end is higher. When the fin 13 is swung to the open position as shown in FIG. 3, the lever 28 is inclined such that its rear end is lower. A columnar pin 29, which extends in the vehicle width direction, is provided at the rear end of the lever 28. The lever 28 swings between the two inclined states, and the pin 29 is also swung about the support shaft 15 as the lever 28 swings.

The rod 30 has an elongated shape and is longer than the lever 28. The rod 30 is arranged to extend in the front-rear direction. The rod 30 has a first elongated hole 31 and a second elongated, hole 32 at positions separated in the front rear direction. In the present embodiment, the first elongated hole 31 is formed in a front portion of the rod 30, and the second elongated hole 32 is formed in a rear portion of the rod 30. The first elongated hole 31 extends in the front-rear direction and is formed through the rod 30 in the vehicle width direction. The dimension of the first elongated hole 31 in the up-down direction is slightly greater than the diameter of the pin 29. The dimension of the first elongated hole 31 in the front-rear direction is longer than the diameter of the pin 29. The pin 29 of the lever 28 is movably received in the first elongated hole 31. In this manner, the lever 28 is operatively coupled to the rod 30 via the pin 29.

The second elongated hole 32 extends in the front-rear direction and is formed through the rod 30 in the vehicle width direction. The dimension of the second elongated hole 32 in the up-down direction is slightly greater than the diameter of the eccentric shaft 27. The dimension of the second elongated hole 32 in the front-rear direction is longer than the diameter of the eccentric shaft 27. The eccentric shaft 27 is movably received in the second elongated hole 32. In this manner, the output shaft 22 of the motor 21 is operatively coupled to the rod 30 via the rotation member 26 and the eccentric shaft 27.

As described above, the pin 29 is engaged with the first elongated hole 31 of the rod 30, the eccentric shaft 27 is engaged with the second elongated hole 32 of the rod 30. As the eccentric shaft 27 orbits about the output shaft 22, the rod 30 is translated in the up-down direction. The rod 30 is movable upward and downward from a reference position, or the position of the support shaft 15 of the fin 13 in the up-down direction. The rod 30 reciprocates in the up-down direction in the movable range while maintaining the posture of extending in the front-rear direction. When the fin 13 is at the closed position as shown in FIG. 1, the rod 30 is at a first end in the movable range. When the fin 13 is at the open position as shown in FIG. 3, the rod 30 is at a second end in the movable range. In the present embodiment, the first end is the highest position in the movable range of the rod 30, and the second end is the lowest position in the movable range of the rod 30. When the fin 13 is swung between the closed position and the open position as shown in FIG. 4, the rod 30 is located between the highest position and the lowest position.

The transmission mechanism 25 further includes a plurality of restriction grooves 33 and sliders 34, the number of which is equal to the number of the restriction grooves 33. In the present embodiment, a pair of restriction grooves 33 and a pair of sliders 34 are provided. As shown in FIG. 2, a vertical wall 35 is immovably formed at a position in the engine compartment that is close to the grille opening 11. The restriction grooves 33 are formed in the vertical wall 35. The vertical wall 35 may be formed by an existing member in the engine compartment or by an additional member. The front restriction grooves 33 linearly extend in the up-down direction at a front portion of the rod 30. The rear restriction grooves 33 linearly extend in the up-down direction at a rear portion of the rod 30. The upper ends of the restriction grooves 33 are at positions slightly higher than the highest position in the movable range of the rod 30. The lower ends of the restriction grooves 33 are at positions slightly lower than the lowest position in the movable range of the rod 30.

The sliders 34 are provided at a plurality of positions on the rod 30 that are separated in the front-rear direction. In the present embodiment, two sliders are provided at a front portion and a rear portion of the rod 30. Each slider 34 is slidably engaged with the corresponding restriction groove 33. Each slider 34 has an elongated shape extending along the restriction groove 33. The dimension of each slider 34 in the up-down direction is longer than its dimension in the front-rear direction.

As the eccentric shaft 27 orbits about the output shaft 22, the rod 30 is translated in the up-down direction within the movable range. The restriction grooves 33, with which the sliders 34 are engaged, allow the sliders 34 to slide only in the direction in which the restriction grooves 33 extend. That is, the restriction grooves 33 allow the sliders 34 to slide in a direction in which the rod 30 is translated, while restricting sliding motion in other directions. Accordingly, the rod 30 is translated in a desired direction in a stable manner.

If each slider 34 is columnar, it might rotate when sliding in the restriction groove 33. In such a case, the rod 30 would be inclined, resulting in an unstable translation of the rod 30. However, if each slider 34 is non-columnar as described above, the slider 34 does not rotate while sliding along the restriction groove 33. Accordingly, the rod 30 is readily translated in a desired direction in a stable manner.

As illustrated by lines formed by a long dash alternating with two short dashes in FIG. 1, the first switch 41 is a limit switch. The first switch 41 is located in an electric circuit (not shown) for supplying electricity to the motor 21. When the rod 30 is not contacting the first switch 41, the first switch 41 operates to cause the electric circuit to supply electricity to the motor 21. When the rod 30 is moved to the highest position in the movable range so that the fin 13 is swung to the closed position, the upper surface of the rod 30 contacts the first switch 41. This activates the first switch 41 so that the electric circuit stops supplying electricity to the motor 21.

As illustrated by lines formed by a long dash alternating with two short dashes in FIG. 3, the second switch 42 is a limit switch, like the first switch 41. The second switch 42 is located in the electric circuit for supplying electricity to the motor 21. When the rod 30 is not contacting the second switch 42, the second switch 42 operates to cause the electric circuit to supply electricity to the motor 21. When the rod 30 is moved to the lowest position in the movable range so that the fin 13 is swung to the open position, the lower surface of the rod 30 contacts the second switch 42. This activates the second switch 42 so that the electric circuit stops supplying electricity to the motor 21.

The limit switches are micro switches that are housed in plastic cases for protecting the switches, for example, from outer force, water, oil, and dust.

The grille shutter device further includes a control device (not shown), which controls operation of the motor 21. The control device determines a target position of the fin 13 based on the vehicle speed and the coolant temperature. The target position can be either of the closed position or the open position. When the target position is switched from the closed position to the open position or from the open position to the closed position, electricity starts being supplied to the motor 21. The supply of electricity to the motor 21 is stopped when the first switch 41 or the second switch 42 contacts the rod 30.

The grille shutter device 12 of the present embodiment is constructed as described above. Next, operation of the grille shutter 12 to open and close the fin 13 will be described. Description on opening and closing operation of the fin 14 is omitted. As mentioned above, opening and closing operation of the fin 14 is in synchronization with those of the fin 13. That is, when the fin 13 is swung, the swinging motion is transmitted to the fin 14 by the link mechanism, so that the fin 14 is swung in synchronization with the fin 13.

FIGS. 1 and 2 are cross-sectional views of the grille shutter device 12 with the fins 13, 14 at the closed position. The fins 13, 14 are at the closed position as shown in FIGS. 1 and 2 under a circumstance where the radiator does not need to be cooled, for example, when the engine is being started.

In this state, electricity is not supplied to the motor 21. The eccentric shaft 27 is located at the highest position in the movable range and at the center in the front-rear direction in the second elongated hole 32 of the rod 30. The rod 30 is located at the highest position in the movable range. The lever 28 is inclined such that its rear end is higher. The pin 29 at the rear end of the lever 28 is located the front end in the first elongated hole 31 of the rod 30. The fins 13, 14 are oriented, to be substantially perpendicular to the flowing-in direction of the outside air through the grille opening 11. In the present embodiment, the fins 13, 14 are oriented substantially vertically. The control device continues setting the target position of the fin 13 at the closed position.

When the grille opening 11 is closed by the fins 13, 14 as described above, outside air is blocked from flowing into the engine compartment through the grille opening 11. Accordingly, the flow of outside air to the radiator is limited. Particularly, since the temperature of the outside air is low in the winter, contact by the radiator with the outside air during starting of the engine cools the coolant. This prolongs the time for warm-up of the engine. However, according to the present embodiment, the grille opening 11 is closed by the fins 13, 14. Thus, the outside air is prevented from passing through the grille opening 11 and from cooling the coolant through contact with the radiator. Accordingly, the time required for the engine warm-up is shortened.

The fins 13, 14 also prevent turbulence of the outside air in the engine compartment, there by preventing air resistance to the vehicle from increasing.

In the state of FIG. 1, when the control device switches the target position of the fin 13 from the closed position to the open position, electricity starts being supplied to the motor 21 to swing the fin 13 to the open position. The target position is switched to the open position, for example, when the radiator needs to be cooled to prevent the engine from overheating. In response to the start of the supply of electricity to the motor 21, the output shaft 22 is rotated in one direction, which is, for example, the clockwise direction in FIG. 1. The rotation of the output shaft 22 is transmitted to the fin 13 while being converted into swinging motion of the fin 13 by the transmission mechanism 25.

That is, as the output shaft 22 rotates, the eccentric shaft 27 orbits about the output shaft 22 in the clockwise direction as viewed in FIG. 1. In accordance with the orbiting motion, the position of the eccentric shaft 27 in the up-down direction and the front-rear direction is changed. In the state of FIG. 1, when the output shaft 22 is rotated clockwise, the eccentric shaft 27 is moved downward and rearward.

When moved downward, the eccentric shaft 27 applies downward pressing force to the rod 30. Accordingly, the pin 29 receives downward pressing force via the rod 30. Since the sliders 34 of the rod 30 are slidably engaged with the restriction grooves 33, the rod 30 is translated downward while maintaining posture of extending in the front-rear direction. Since the eccentric shaft 27 is moved rearward in the second elongated hole 32 in the rod 30, the rod 30 does not block the rearward movement of the eccentric shaft 27.

As the rod 30 is translated downward, the position of the pin 29 in the up-down direction and the front-rear direction is changed. In the state of FIG. 1, when the rod 30 is translated downward, the pin 29 is moved, downward and rearward. As the pin 29 is moved, the lever 28 is swung clockwise and downward about the support shaft 15 as viewed in FIG. 1. In this state, the pin 29 is moved rearward. Since the pin 29 is slidably supported in the first elongated hole 31 of the rod 30, the rod 30 does not block, the rearward movement of the pin 29. Since the fin 13 is integrally coupled to the lever 28 via the support shaft 15, the fin 13 swings about the support shaft 15 when the lever 28 swings. In this manner, the grille opening 11 is opened, so that outside air is allowed to enter the engine compartment through the grille opening 11.

As described above, when the eccentric shaft 27 orbits from the state shown in FIG. 1 to a midway position between the lowest position and the highest position in the movable range, the rod 30 reaches a midway position in the movable range as shown in FIG. 4. In this state, the rod 30 is located substantially at the same position as the support shaft 15 in the up-down direction. When the rod 30 reaches the midway position in the movable range, the eccentric shaft 27 reaches the rear end in the movable range. The second elongated hole 32 is configured such that when the rod 30 reaches the midway position in the movable range, the eccentric shaft 27 reaches the rear end in the second elongated hole 32 of the rod 30.

When the rod 30 reaches the midway position in the movable range, the pin 29 is located substantially at the same position as the support shaft 15 in the up-down direction. Further, the first elongated hole 31 is configured such that when the rod 30 reaches the midway position in the movable range, the pin 29 reaches the rear end in the first elongated hole 31 of the rod 30. As the pin 29 moves in the above described manner, the lever 28 is oriented horizontally as shown in FIG. 4. The fin 13 reaches the midway position between the open position and the closed position, so that the grille opening 11 is half open.

When the output shaft 22 is further rotated clockwise from the state of FIG. 4, the eccentric shaft 27 orbits further about the output shaft 22. That is, the eccentric shaft 27 is moved forward while being moved downward. The eccentric shaft 27, which is moving downward, continuously applies downward pressing force to the rod 30. Accordingly, the pin 29 continuously receives downward pressing force via the rod 30. The rod 30 is translated downward while maintaining the posture of extending in the front-rear direction. Since the eccentric shaft 27 is moved forward in the second elongated hole 32 in the rod 30, the rod 30 does not block the forward movement of the eccentric shaft 27.

As the rod 30 is translated downward, the position of the pin 29 in the up-down direction and the front-rear direction is changed. In the state of FIG. 4, when the rod 30 is translated downward, the pin 29 is moved downward and forward. As the pin 29 is moved, the lever 28 is continuously swung clockwise and downward about the support shaft 15 as viewed in FIG. 4. In this state, the pin 29 is moved forward. Since the pin 29 is slidably supported in the first elongated hole 31 of the rod 30, the rod 30 does not block the forward movement of the pin 29. As the lever 28 is swung upward, the fin 13 is swung in the same direction as the lever 28, which opens the grille opening 11 further.

As described, above, when the eccentric shaft 27 orbits from the state shown in FIG. 4 to the lowest position in the movable range, the rod 30 is translated downward and reaches the lowest position in the movable range as shown in FIG. 3. When the rod 30 reaches the lowest position in the movable range, the eccentric shaft 27 reaches the midway position in the front-rear direction in the movable range. When the rod 30 reaches the lowest position in the movable range, the eccentric shaft 27 reaches the midway position in the front-rear direction in the second elongated hole 32.

Also, when the rod 30 is translated downward from the state shown in FIG. 4, the pin 29 is moved downward and forward. When the rod 30 reaches the lowest position in the movable range, the pin 29 reaches the front end in the first elongated hole 31 of the rod 30 as shown in FIG. 3. In this state, the pin 29 is located at a position lower than the support shaft 15. As the pin 29 is moved, the lever 28 is inclined such that its rear end is lower. The fin 13 reaches the open position, and the grille opening 11 is in the fully open state. Therefore, a great amount of outside air is allowed to flow in the engine compartment through the grille opening 11, which improves the cooling efficiency of the coolant in the radiator.

Also, when the rod 30 reaches the lowest position in the movable range, the second switch 42 contacts the lower surface of the rod 30. At this, the second switch 42 is activated and stops the supply of electricity to the motor 21. As the supply of electricity is stopped, the rotation of the output shaft 22 is stopped and the swinging motion of the fin 13 is stopped at the open position.

In a state in which the fin 13 is stopped at the open position, if the control device switches the target position of the fin 13 from the open position to the closed position, electricity starts being supplied to the motor 21 to swing the fin 13 to the closed position shown in FIG. 1. In response to the start of the supply of electricity, the output shaft 22 is rotated in one direction, which is the clockwise direction in FIG. 3. The rotation of the output shaft 22 is converted into reciprocation of the rod 30 and transmitted to the fin 13 while being converted into swinging motion of the fin 13 by the transmission mechanism 25.

That is, the output shaft 22 is rotated clockwise from the state of FIG. 3, and the eccentric shaft 27 orbits about the output shaft 22 in the clockwise direction as viewed in FIG. 3. In this state, the eccentric shaft 27 is moved upward while being moved forward.

The eccentric shaft 27, which is moving upward, applies upward pressing force to the rod 30. Accordingly, the rod 30 is translated upward while maintaining the posture of extending in the front-rear direction. While being moved upward, the rod 30 pushes the pin 29 upward. Since the eccentric shaft 27 is moved forward in the second elongated hole 32 in the rod 30, the rod 30 does not block the forward movement of the eccentric shaft 27.

As the rod 30 is translated upward, the pin 29 is moved rearward while being moved upward. As the pin 29 is moved, the lever 28 is swung counterclockwise and upward about the support shaft 15 as viewed in FIG. 3. In this state, the pin 29 is moved rearward. Since the pin 29 is slidably supported in the first elongated hole 31 of the rod 30, the rod 30 does not block the rearward movement of the pin 29. As the lever 28 is swung upward, the fin 13 is swung in the same direction as the lever 28. In this manner, the grille opening 11 is closed.

As described above, when the eccentric shaft 27 orbits from the state shown in FIG. 3 to a midway position between the lowest position and the highest position in the movable range, the rod 30 is translated upward and reaches a midway position in the movable range as shown in FIG. 4. When the rod 30 reaches the midway position in the movable range, the rod 30 is located substantially at the same position as the support shaft 15 in the up-down direction. In this state, as indicated by lines formed by a long dash alternating with two short dashes in FIG. 4, the eccentric shaft 27 reaches the front end in the second elongated hole 32 of the rod 30.

When the eccentric shaft 27 reaches the position indicated by the line formed by a long dash alternating with two short dashes in FIG. 4, the pin 29 reaches the same position as the support shaft 15 in the up-down direction, and reaches the rear end in the first elongated hole 31 of the rod 30. In this state, the lever 28 is oriented horizontally. The fin 13 reaches the midway position between the open position and the closed position and is inclined such that its front end is lower, so that the grille opening 11 is half open.

When the output shaft 22 is further rotated clockwise with the eccentric shaft 27 located at the position indicated the line formed by a long dash alternating with two short dashes in FIG. 4, the eccentric shaft 27 orbits about the output shaft 22 further. That is, the eccentric shaft 27 is moved rearward while being moved upward. The eccentric shaft 27, which is moving upward, continuously applies upward pressing force to the rod 30. Accordingly, the pin 29 continuously receives upward pressing force via the rod 30. The rod 30 is translated upward while maintaining the posture of extending in the front-rear direction. Since the eccentric shaft 27 is moved rearward in the second elongated hole 32 in the rod 30, the rod 30 does not block the rearward movement of the eccentric shaft 27.

As the rod 30 is translated upward, the pin 29 is moved forward while being moved upward. As the pin 29 is moved, the lever 28 is continuously swung counterclockwise and upward about the support shaft 15 as viewed in FIG. 4. In this state, the pin 29 is moved forward. Since the pin 29 is slidably supported in the first elongated hole 31 of the rod 30, the rod 30 does not block the forward movement of the pin 29. As the lever 28 is swung upward, the fin 13 is swung in the same direction as the lever 28, which closes the grille opening 11.

As described above, when the eccentric shaft 27 orbits from the state indicated by the line formed by a long dash alternating with two short dashes in FIG. 4 to the highest position in the movable range, the rod 30 is moved upward and reaches the highest position in the movable range as shown in FIG. 1. In this state, the eccentric shaft 27 reaches the midway position in the second elongated hole 32 of the rod 30 in the front-rear direction.

As the rod 30 is translated upward, the pin 29 is moved forward while being moved upward. When the rod 30 reaches the highest position in the movable range, the pin 29 reaches the front end in the first elongated hole 31 of the rod 30 as shown in FIG. 1. In this state, the pin 29 is located at a position higher than the support shaft 15. As the pin 29 is moved, the lever 28 is inclined such that its rear end is higher. The fin 13 reaches the closed position, so that the grille opening 11 is closed. Outside air is thus blocked from flowing into the engine compartment through the grille opening 11.

Also, when the rod 30 reaches the highest position in the movable range, the first switch 41 contacts the upper surface of the rod 30. In this state, the first switch 41 is activated and stops the supply of electricity to the motor 21. As the supply of electricity is stopped, the rotation of the output shaft 22 is stopped and the swinging motion of the fin 13 is stopped at the closed position.

Each time the control device switches the target position of the fin 13, the above described operation is repeated.

As described above, the motor 21, which rotates the output shaft 22 in one direction when supplied with electricity, swings the fin 13 between the closed position and the open position. The transmission mechanism 25 transmits the rotation of the output shaft 22 to the fin 13 while converting the rotation into swinging motion of the fin 13. Also, when the fin 13 is swung to the closed position, the first switch 41 stops supplying electricity to the motor 21, so that the fin 13 is stopped at the closed position. When the fin 13 is swung to the open position, the second switch 42 stops supplying electricity to the motor 21, so that the fin 13 is stopped at the open position. Thus, no complicated control device designed for switching the rotation direction of the motor 21 is required. In the present embodiment, when the target position of the fin 13 is switched, the fin 13 is opened or closed through a simple control for starting the supply of electricity to the motor 21.

When the rod 30 is moved to the first end in the movable range (the highest position), the fin 13 reaches the closed position. Further, when the rod 30 reaches the first end in the movable range, the first switch 41 stops the supply of electricity to the motor 21. Therefore, when the fin 13 reaches the closed position, the motor 21 is stopped and the fin 13 is stopped at the closed position.

When the rod 30 is moved to the second end in the movable range (the lowest position), the fin 13 reaches the open position. When the rod 30 reaches the second end in the movable range, the second switch 42 stops the supply of electricity to the motor 21. Therefore, when the fin 13 reaches the open position, the motor 21 is stopped and the fin 13 is stopped at the open position.

The present embodiment has the following advantages.

(1) The grille shutter device 12 according to the present embodiment includes the fin 13, the motor 21, and the transmission mechanism 25. The fin 13 is supported by the support shaft 15 to be allowed to swing. The motor 21 rotates the output shaft 22 in one direction when supplied with electricity. The transmission mechanism 25 transmits the rotation of the output shaft 22 to the fin 13 while converting the rotation into swinging motion of the fin 13. The grille shutter device 12 further includes the first switch 41 and the second switch 42. When the fin 13 is swung to the closed position, the first switch 41 contacts a component such as the rod 30 of the transmission mechanism 25 and is activated to stop the supply of electricity to the motor 21. When the fin 13 is swung to the open position, the second switch 42 contacts the rod 30 and is activated to stop the supply of electricity to the motor 21.

Therefore, the fin 13 can be opened and closed without performing complicated control for switching rotation direction of the motor 21. The motor 21, which rotates the output shaft 22 in one direction, is employed, and electricity starts being supplied to the motor 21 when the position of the fin 13 is switched. In other words, the fin 13 is opened and closed through such a simple control.

(2) The transmission mechanism 25 includes the eccentric shaft 27, the rod 30, and the lever 28. As the output shaft 22 of the motor 21 rotates, the eccentric shaft 27 orbits about the output shaft 22. The rod 30 is translated as the eccentric shaft 27 orbits. The lever 28 is integrally coupled to the fin 13 via the support shaft 15 to be swung about the support shaft 15 integrally with the fin 13. The lever 28 is operatively coupled to the rod 30. When the rod 30 is translated, the support shaft 15 swings about a fulcrum.

With such a simple configuration, the fin 13 can be swung between the closed position and the closed position by rotating the output shaft 22 of the motor 21 in one direction.

(3) The transmission mechanism 25 is configured such that, when the rod 30 is located at the first end (the highest position) in the movable range, the fin 13 is located at the closed position, and that, when the rod 30 is located at the second end (the lowest position) in the movable range, the fin 13 is located at the open position. The transmission mechanism 25 transmits the rotation of the output shaft 22 to the fin 13 while converting the rotation into swinging motion of the fin 13.

The first switch 41 is configured to contact the rod 30 when the rod 30 is moved to the first end (the highest position) in the movable range. When contacting the rod 30, the first switch 41 is activated to stop the supply of electricity to the motor 21. Likewise, the second switch 42 is configured to contact the rod 30 when the rod 30 is moved to the second end (the lowest position) in the movable range. When contacting the rod 30, the second switch 42 is activated to stop the supply of electricity to the motor 21.

Therefore, when the rod 30 contacts the first switch 41, the first switch 41 is activated to stop the supply of electricity to the motor 21, so that the fin 13 is stopped at the closed position. Also, when the rod 30 contacts the second switch 42, the second switch 42 is activated to stop the supply of electricity to the motor 21, so that the fin 13 is stopped at the open position.

(4) In connection with the above item (3), the first switch 41 and the second switch 42 are arranged at positions where the first and second switches 41, 42 contact the rod 30 when the rod 30 is at either end in the movable range.

Therefore, compared to a case in which the first switch 41 and the second switch 42 are located elsewhere, the structure of the grille shutter device 12 is simplified.

(5) The transmission mechanism 25 includes the restriction grooves 33 and the sliders 34, the number of which is equal to the number of the restriction grooves 33. The restriction grooves 33 each extend in a direction in which the rod 30 is translated. The sliders 34 are provided at a plurality of positions on the rod 30 and slidably engaged with the restriction grooves 33.

Therefore, the restriction grooves 33 restrict the sliders 34 from moving in directions different from the sliding direction, thereby allowing the rod 30 to be stably translated in a desired direction.

(6) Each slider 34 has an elongated shape extending along the restriction groove 33.

Thus, when sliding along the corresponding restriction groove 33, each slider 34 is prevented from rotating in the restriction groove 33. Accordingly, the rod 30 can be translated in a desired direction (the up-down direction) in a stable manner.

The present invention may be modified in the following forms.

<Regarding Fins 13, 14>

The fins 13, 14 may be configured to be swung about support shafts that extend in a direction different from that in the above illustrated embodiment. For example, the fins 13, 14 may be configured to be swung about support shafts that extend in the up-down direction. In this case, the fins 13, 14 are swung in the vehicle width direction.

The number of the fins 13, 14 may be one or more than two.

The open position of the fins 13, 14 does not need to be the fully open position. That is, a position where the fins 13, 14 are inclined relative to the fully open position may be defined as the open position.

<Regarding Rotation Member 26>

The shape of the rotation member 26, which connects the output shaft 22 of the motor 21 and the eccentric shaft 27 to each other, is not limited to a disk. For example, the rotation member 26 may be formed as an elongated plate that extends from the output shaft 22 in the radial direction of the output shaft 22.

<Regarding First Switch 41 and Second Switch 42>

A type of switch other than limit switch may be used for the first switch 41 and the second switch 42.

FIG. 1 illustrates a configuration of the first switch 41 in which, when the fin 13 is swung to the closed position by supply of electricity to the motor 21, the first switch 41 contacts a component of the transmission mechanism 25 and is activated to stop the supply of electricity as shown in FIG. 1. In this configuration, the position at which the first switch 41 is attached may be changed.

Also, FIG. 2 illustrates a configuration of the second switch 42 in which, when the fin 13 is swung to the open position by supply of electricity to the motor 21, the second switch 42 contacts a component of the transmission mechanism 25 and is activated to stop the supply of electricity as shown in FIG. 3. In this configuration, the position at which the second switch 42 is attached may be changed.

For example, the first switch 41 and the second switch 42 may be arranged at opposite positions in the radial direction of the rotation member 26, and a protrusion may be formed on the outer circumferential surface of the rotation member 26. In this case, the grille shutter device 12 may be configured such that when the fin 13 is swung to the closed position, the protrusion contacts the first switch 41, and that when the fin 13 is swung to the open position, the protrusion contacts the second switch 42.

Therefore, the present examples and embodiments are to be considered as illustrative and not restrictive and the invention is not to be limited to the details given herein, but may be modified within the scope and equivalence of the appended claims.

The invention claimed is:

1. A grille shutter device for selectively opening and closing a grille opening in a front grille of a vehicle, the grille shutter device comprising:
   at least one fin having a support shaft, which is rotatably supported by the front grille, wherein the one fin can is configured to swing about the support shaft between a closed position and an open position, and in the closed position the one fin is arranged to close the front grille opening and prevent passage of air through the front grille opening, and in the open position the one fin is arranged to open the front grille opening and permit passage of the air through the front grille opening;
   a motor having an output shaft, the motor rotating the output shaft in one direction when supplied with electricity and not rotating the shaft in the one direction when not supplied with electricity;
   a transmission mechanism configured to transmit rotation of the output shaft of the motor in the one direction to the fin, converting the rotation of the output shaft to a swinging motion of the fin, and swinging the fin between the closed position and the open position;
   the transmission mechanism includes:
      at least one slider slidably engaged with at least one restriction groove;
      the one restriction groove extending in an up-down direction and containing a movable range, and the movable range having first and second ends;

an eccentric shaft configured to orbit about the output shaft as the output shaft of the motor rotates; and
a rod attached to the one slider, engaging the eccentric shaft and the support shaft of the one fin and configured to rotate the one fin between the open and closed positions, the rod reciprocating in the up-down direction within a movable range of the one restriction groove, while the rod extends in a front-rear direction;
a first switch configured to stop the supply of electricity to the motor when contacted by the rod moving to the first end of the movable range, and after swinging the one fin to the closed position by orbiting the eccentric shaft, moving the rod in the up-down direction and rotating the support shaft of the one fin to swing the one fin to the closed position; and
a second switch configured to stop the supply of electricity to the motor when contacted by the rod moving to the second end of the movable range, and after swinging the one fin to the open position by supplying the motor with electricity, orbiting the eccentric shaft, moving the rod in the up-down direction and rotating the support shaft of the one fin to swing the one fin to the open position.

2. The grille shutter device according to claim 1, wherein the transmission mechanism includes:
a lever integrated with the fin via the support shaft, wherein the lever is operatively coupled to the rod, the lever swings about the support shaft as the rod reciprocates, and the lever is longer than the rod.

3. The grille shutter device according to claim 2, wherein the transmission mechanism is configured to move the fin to the closed position when the rod is located at the first end in the movable range and to move the fin to the open position when the rod is located at the second end in the movable range.

4. The grille shutter device according to claim 1, wherein the one slider is elongated and extends along the restriction groove.

5. The grille shutter device according to claim 1, wherein the transmission mechanism further includes:
a second slider slidably engaged with a second restriction groove,
the second restriction groove extending in the up-down direction and containing another movable range having first and second ends matching those of the one restriction groove, and
the rod having first and second ends respectively attached to the one slider and the second slider, the rod engaging the eccentric shaft and the support shaft of the one fin and configured to swing the one fin between the open and closed positions, the rod reciprocating in the up-down direction within the movable ranges of the one restriction groove and the second restriction groove, while the rod extends in a front-rear direction.

6. A grille shutter device for selectively opening and closing a grille opening in a front grille of a vehicle, the grille shutter device comprising:
at least one fin arranged in the grille opening and having a support shaft rotatably supported by the front grille, the one fin rotating with and about the support shaft and swinging between a closed position and an open position, and in the closed position the one fin is configured to block passage of air through the grille opening, and in the open position the one fin is configured to permit passage of air through the grille opening;
a motor having an output shaft, the output shaft rotating when the motor is energized and not rotating when the motor is deenergized;
a transmission mechanism connected between the output shaft of the motor and the fin and configured to convert rotation movement of the output shaft of the motor to the swinging motion of the fin and swinging the fin between the closed and opened position, the transmission mechanism including:
at least one slider sliding within at least one restriction groove;
the one restriction groove extending linearly and defining a movable range within which the one slider slides, and the movable range having first and second ends;
an eccentric shaft configured to rotate about the output shaft as the motor rotates the output shaft; and
a rod being attached to the one slider and extending transversely relative to the linear direction of the one restriction groove, the rod engaging the eccentric shaft and being connected to the motor and the support shaft of the one fin, the rod being configured to swing the one fin between the open and closed positions by rotating the support shaft in response to the rod reciprocating back and forth within the one restriction groove in response to the eccentric shaft rotating about the output shaft when the motor is energized, while the rod extends transversely to the reciprocating motion of the rod within the one restriction groove;
a first switch configured to deenergize the motor when contacted by the rod as the one slider slides to the first end of the movable range of the one restriction groove after the motor is energized and the one fin is swung to the closed position; and
a second switch configured to deenergize the motor when contacted by the rod as the one slider slides to the second end of the movable range of the one restriction groove after the motor is energized and the one fin is swung to the open position.

7. The grille shutter device according to claim 6, wherein the transmission mechanism includes a lever integrated with the fin via the support shaft, wherein the lever is operatively coupled to the rod, the lever swings about the support shaft as the rod reciprocates, and the lever is longer than the rod.

8. The grille shutter device according to claim 6, wherein the transmission mechanism further includes:
a second slider sliding within a second restriction groove,
the second restriction groove extending in a linear direction and containing another movable range having first and second ends matching those of the one restriction groove, and
the rod having first and second ends respectively attached to the one slider and the second slider, the rod engaging the eccentric shaft and the support shaft of the one fin and configured to swing the one fin between the open and closed positions, the rod reciprocating back and forth in the linear directions of the one restriction groove and the second restriction groove and within the movable ranges of the one restriction groove and the second restriction groove, while the rod extends transversely to the reciprocating motion of the rod guided by the one and the second sliders sliding in the one and the second restriction grooves.

* * * * *